(12) United States Patent
Huo et al.

(10) Patent No.: US 12,547,383 B2
(45) Date of Patent: Feb. 10, 2026

(54) FRONT-END CODE GENERATION METHOD AND APPARATUS

(71) Applicant: Beijing Wodong Tianjun Information Technology Co., Ltd., Beijing (CN)

(72) Inventors: Yinghui Huo, Beijing (CN); Yanchun Yang, Beijing (CN); Shanshan Wei, Beijing (CN); Yingzi Dong, Beijing (CN); Hao Wang, Beijing (CN); Jinghe Hu, Beijing (CN); Weipeng Yan, Beijing (CN)

(73) Assignee: Beijing Wodong Tianjun Information Technology Co., Ltd., Beijing (CN)

( * ) Notice: Subject to any disclaimer, the term of this patent is extended or adjusted under 35 U.S.C. 154(b) by 304 days.

(21) Appl. No.: 18/272,523

(22) PCT Filed: Jan. 5, 2022

(86) PCT No.: PCT/CN2022/070248
§ 371 (c)(1),
(2) Date: Jul. 14, 2023

(87) PCT Pub. No.: WO2022/152015
PCT Pub. Date: Jul. 21, 2022

(65) Prior Publication Data
US 2024/0069876 A1   Feb. 29, 2024

(30) Foreign Application Priority Data
Jan. 15, 2021   (CN) .......................... 202110056755.3

(51) Int. Cl.
G06F 8/38   (2018.01)
G06F 8/34   (2018.01)

(52) U.S. Cl.
CPC . G06F 8/38 (2013.01); G06F 8/34 (2013.01)

(58) Field of Classification Search
CPC ..................................... G06F 8/34; G06F 8/38
See application file for complete search history.

(56) References Cited

U.S. PATENT DOCUMENTS

2004/0205708 A1 * 10/2004 Kothari ..................... G06F 8/30
717/113
2018/0024850 A1   1/2018 Caro Estevez

FOREIGN PATENT DOCUMENTS

CN   106933552 A   * 7/2017   ............... G06F 8/30
CN   109343845 A   2/2019
(Continued)

OTHER PUBLICATIONS

SB Pole "Automatic Code Generation Using J A V A and XML Technologies" (Year: 2001).*
(Continued)

Primary Examiner — Phillip H Nguyen
(74) Attorney, Agent, or Firm — BLANK ROME LLP

(57) ABSTRACT

The present disclosure provides a method and apparatus for generating a front-end code. The method includes: acquiring attribute information of view elements in a target UI view interface; determining child view elements corresponding to a given parent view element based on the attribute information of the view elements; determining, according alternately to row correlation information and column correlation information between the child view elements, nodes at different levels of a DOM, tree corresponding to the parent view element except a root node until each leaf node is an individual child view element, to obtain the DOM tree; and generating a complete front-end code corresponding to the target UI view interface based on the DOM tree.

20 Claims, 6 Drawing Sheets

(56) References Cited

FOREIGN PATENT DOCUMENTS

| CN | 109992266 A1 | 7/2019 | | |
|---|---|---|---|---|
| CN | 111124380 A | * | 5/2020 | ............... G06F 8/30 |
| CN | 111414165 A | | 7/2020 | |
| CN | 111475163 B | | 10/2020 | |
| CN | 111857704 A | | 10/2020 | |
| CN | 113778403 A | | 12/2021 | |
| CN | 108170409 B | * | 6/2023 | ............... G06F 8/38 |

OTHER PUBLICATIONS

J Keith, "DOM Scripting Web Design with JavaScript and the Document Object Model" (Year: 2005).*
International Search Report for PCT/CN2022/070248, dated Apr. 6, 2022, 2 pgs.
Chinese Office Action for CN202110056755.3, dated Jul. 22, 2022, 6 pgs.
Extended European Search Report issued in corresponding European application No. 22738896.4, mailed Nov. 27, 2024, 9 pages.

* cited by examiner

FRONT-END CODE GENERATION METHOD AND APPARATUS

CROSS-REFERENCE TO RELATED APPLICATIONS

This patent application is a U.S. National Stage of International Application No. PCT/CN2022/070248, filed on Jan. 5, 2022, which claims the priority from Chinese Patent Application No. 202110056755.3, filed on Jan. 15, 2021 and entitled "Method and Apparatus for Generating Front-end Code" the entire disclosures of which are hereby incorporated by reference.

TECHNICAL FIELD

The present disclosure relates to the field of computer technology, specifically to the field of computer software technology, and particularly to a method and apparatus for generating a front-end code.

BACKGROUND

With the development of Internet technology, front-end intelligence has become an inevitable trend. The construction of a platform that automatically converts UI (User Interface) drafts into codes can not only improve the efficiency of front-end development, but also liberate front-end productivity, thereby reducing labor costs.

SUMMARY

Embodiments of the present disclosure provide a method and apparatus for generating a front-end code, a device and a storage medium.

According to a first aspect, an embodiment of the present disclosure provides a method for generating a front-end code, including: acquiring attribute information of view elements in a target UI view interface; determining child view elements corresponding to a given parent view element based on the attribute information of the view elements, where there is no partial superimposition relationship between the child view elements; determining, according alternately to row correlation information and column correlation information between the child view elements, nodes at different levels of a DOM, tree corresponding to the parent view element except a root node until each leaf node is an individual child view element, to obtain the DOM tree; and generating a complete front-end code corresponding to the target UI view interface based on the DOM tree.

According to a second aspect, an embodiment of the present disclosure provides an apparatus for generating a front-end code, including: an acquiring module, configured to acquire attribute information of view elements in a target UI view interface; a determining module, configured to determine child view elements corresponding to a given parent view element based on the attribute information of the view elements, where there is no partial superimposition relationship between the child view elements; a constructing module, configured to determine, according alternately to row correlation information and column correlation information between the child view elements, nodes at different levels of a DOM, tree corresponding to the parent view element except a root node until each leaf node is an individual child view element, to obtain the DOM tree; and a generating module, configured to generate a complete front-end code corresponding to the target UI view interface based on the DOM tree.

According to a third aspect, an embodiment of the present disclosure provides an electronic device. The electronic device includes one or more processors, and a memory storing one or more programs. The one or more programs when executed by one or more processors, cause the one or more processors to implement the method for generating a front-end code according to any embodiment in the first aspect.

According to a fourth aspect, an embodiment of the present disclosure provides a computer readable medium, storing a computer program. When the program is executed by a processor, the method for generating a front-end code according to any embodiment in the first aspect is implemented.

It should be understood that the content described in this part is not intended to identify key or important features of the embodiments of the present disclosure, and is not used to limit the scope of the present disclosure. Other features of the present disclosure will be easily understood through the following description.

DETAILED DESCRIPTION OF EMBODIMENTS

Exemplary embodiments of the present disclosure are described below in combination with the accompanying drawings, and various details of embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
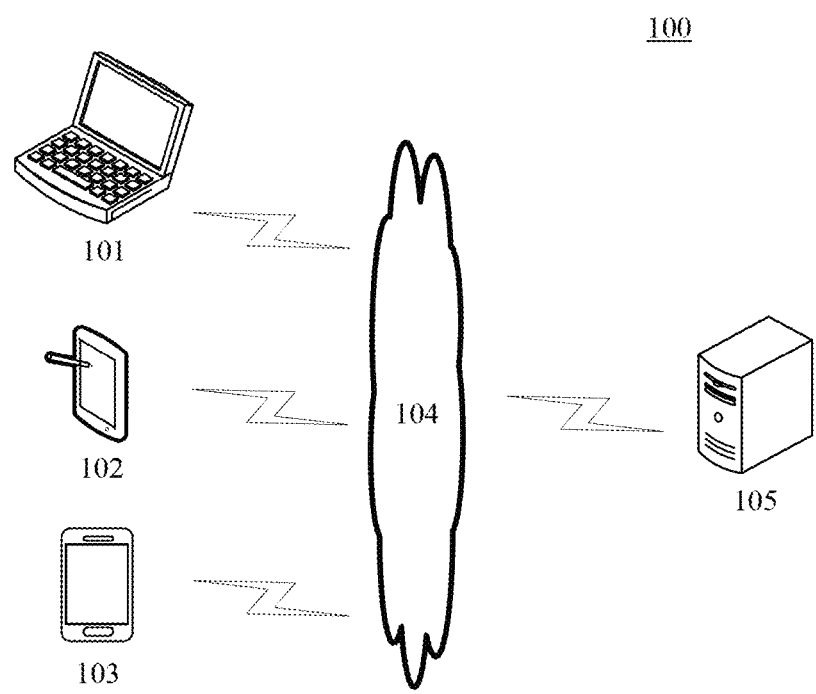
FIG. 1 is a diagram of an exemplary system architecture in which the present disclosure may be applied.

FIG. 1 illustrates an exemplary system architecture 100 in which an embodiment of a method for generating a front-end code according to the present disclosure may be applied.

As shown in FIG. 1, the system architecture 100 may include terminal devices 101, 102 and 103, a network 104, and a server 105. The network 104 serves as a medium providing a communication link between the terminal devices 101, 102 and 103 and the server 105. The network 104 may include various types of connections, for example, wired or wireless communication links, or optical fiber cables.

The terminal devices 101, 102 and 103 interact with the server 105 via the network 104, to receive or send messages, etc. Various communication client applications (e.g., a shopping application and an communication application) may be installed on the terminal devices 101, 102 and 103.

The terminal devices 101, 102 and 103 may be hardware or software. When being the hardware, the terminal devices 101, 102 and 103 may be various electronic devices having a display screen, the electronic devices including, but not limited to, a mobile phone and a notebook computer. When being the software, the terminal devices 101, 102 and 103 may be installed in the above electronic devices. The terminal devices may be implemented as a plurality of pieces of software or a plurality of software modules (e.g., used to provide a front-end code generation service), or may be implemented as a single piece of software or a single software module, which will not be specifically limited here.

The server 105 may be a server providing various services. For example, the server acquires attribute information of view elements in a target UI view interface; determines child view elements corresponding to a given parent view element based on the attribute information of the view elements, where there is no partial superimposition relationship between the child view elements; determines, according alternately to row correlation information and column correlation information between the child view elements, nodes at different levels of a DOM (Document Object Model) tree corresponding to the parent view element except a root node until each leaf node is an individual child view element, to obtain the DOM tree; and generates a complete front-end code corresponding to the target UI view interface based on the DOM tree.

It should be noted that the server 105 may be hardware or software. When being the hardware, the server 105 may be implemented as a distributed server cluster composed of a plurality of servers, or as a single server. When being the software, the server may be implemented as a plurality of pieces of software or a plurality of software modules (e.g., used to provide a front-end code generation service), or as a single piece of software or a single software module, which will not be specifically limited here.

It should be noted that the method for generating a front-end code provided in the embodiments of the present disclosure may be performed by the server 105, by the terminal devices 101, 102 and 103, or by the server 105 and the terminal devices 101, 102 and 103 in cooperation with each other. Correspondingly, the parts (e.g., units, sub-units, modules, and sub-modules) included in the apparatus for generating a front-end code may be all provided in the server 105, all provided in the terminal devices 101, 102 and 103, or separately provided in the server 105 and the terminal devices 101, 102 and 103.

It should be appreciated that the numbers of the terminal devices, the networks and the servers in FIG. 1 are merely illustrative. Any number of terminal devices, networks and servers may be provided based on actual requirements.

Figure 2:
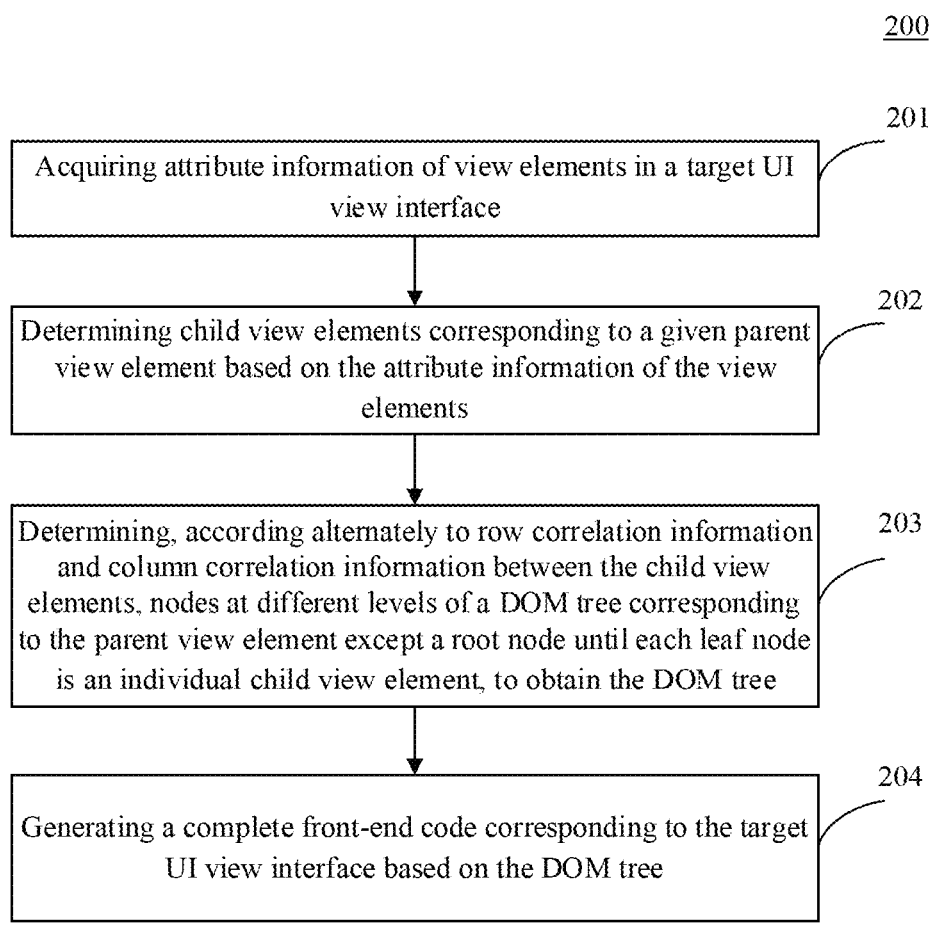
FIG. 2 is a flowchart of an embodiment of a method for generating a front-end code according to the present disclosure.

FIG. 2 is a schematic flow diagram 200 of an embodiment of a method for generating a front-end code that can be applied to the present disclosure. In this embodiment, the method for generating a front-end code includes the following steps.

Step 201, acquiring attribute information of view elements in a target UI view interface.

In this embodiment, an executing body (e.g., the server 105 or terminal devices 101, 102 and 103 shown in FIG. 1) may directly acquire the attribute information of each view element in a UI view interface in which a front-end code is to be generated, that is, the target UI view interface, or may first convert the UI view interface into JSON data, and then acquire the attribute information of each view element from the JSON data, which is not limited in the present disclosure.

Here, the attribute information of a view element may include at least one of: an identifier of the view element, absolute positioning information (x, y), a width, and a height.

Specifically, the executing body may first convert the target UI view interface into JSON data, and the JSON data corresponding to each view element in the UI view interface may contain the attribute information such as an identifier of the view element, absolute positioning information (x, y), a width and a height.

Here, the absolute positioning information is generally used to indicate the positioning information of the view element with respect to the upper left corner of the target UI view interface.

Step 202, determining child view elements corresponding to a given parent view element based on the attribute information of the view elements.

In this embodiment, the executing body may directly compare the absolute positioning information, heights and widths of every two view elements in the view elements, to determine the child view elements corresponding to the same parent view element; or may compare the absolute positioning information, heights and widths of every two view elements in the view elements according to a descending order of areas of the view elements, to determine the child view elements corresponding to the same parent view element, which is not limited in the present disclosure.

It should be noted that there is no partial superimposition relationship between the determined child view elements corresponding to the same parent view element.

Here, the superimposition relationship between the child view elements may be determined according to whether the number of superimposed pixels in the child view elements is greater than or equal to a preset pixel number threshold. Here, the pixel number threshold may be determined according to experience, actual requirements and a specific application scenario, which is not limited in the present disclosure.

Specifically, the numbers of pixels of a child view element A and a child view element B are both 1000, the number of superimposed pixels is 1, and the pixel number threshold is 50. Since the number of the superimposed pixels is less than the pixel number threshold, there is no partial superimposition relationship between the child view element A and the child view element B.

In addition, for child view elements having a complete superimposition relationship (i.e., the absolute positioning information, widths and heights of two child view elements are all the same), the two child view elements are merged into one child view element.

Step 203, determining, according alternately to row correlation information and column correlation information between the child view elements, nodes at different levels of a DOM tree corresponding to the parent view element except a root node until each leaf node is an individual child view element, to obtain the DOM tree.

In this embodiment, after acquiring the child view elements corresponding to the same parent view element, the executing body may first determine the nodes at the second level of the DOM tree corresponding to the parent view element except the root node (at the first level) according to the row correlation information between the child view elements, then determine the nodes at the third level of the DOM tree except the parent node according to the column correlation information between the child view elements, and so on, until the leaf node is an individual child view element, thus obtaining the DOM tree; or may first determine the nodes at the second level of the DOM tree corresponding to the parent view element except the root node according to the column correlation information between the child view elements, then determine the nodes at the third level of the DOM tree except the parent node according to the row correlation information between the child view elements, and so on, until the leaf node is an individual child view element, thus obtaining the DOM tree, which is not limited in the present disclosure.

Here, the row correlation information between the child view elements is used to indicate a relative position relationship of the child view elements corresponding to the same parent view element in the direction of a row. The column correlation information between the child view elements is used to indicate a relative position relationship of the child view elements corresponding to the same parent view element in the direction of a column.

Here, when the executing body determines nodes at the current level according to the row correlation information between the child view elements, child view elements in the same row in the child view elements corresponding to the parent node at the previous level are classified as one node at this level, and when the executing body determines nodes at the current level according to the column correlation information between the view elements, child view elements in the same column in the child view elements corresponding to the parent node at the previous level are classified as one node at this level until the leaf node is an individual child view element.

Figure 3:
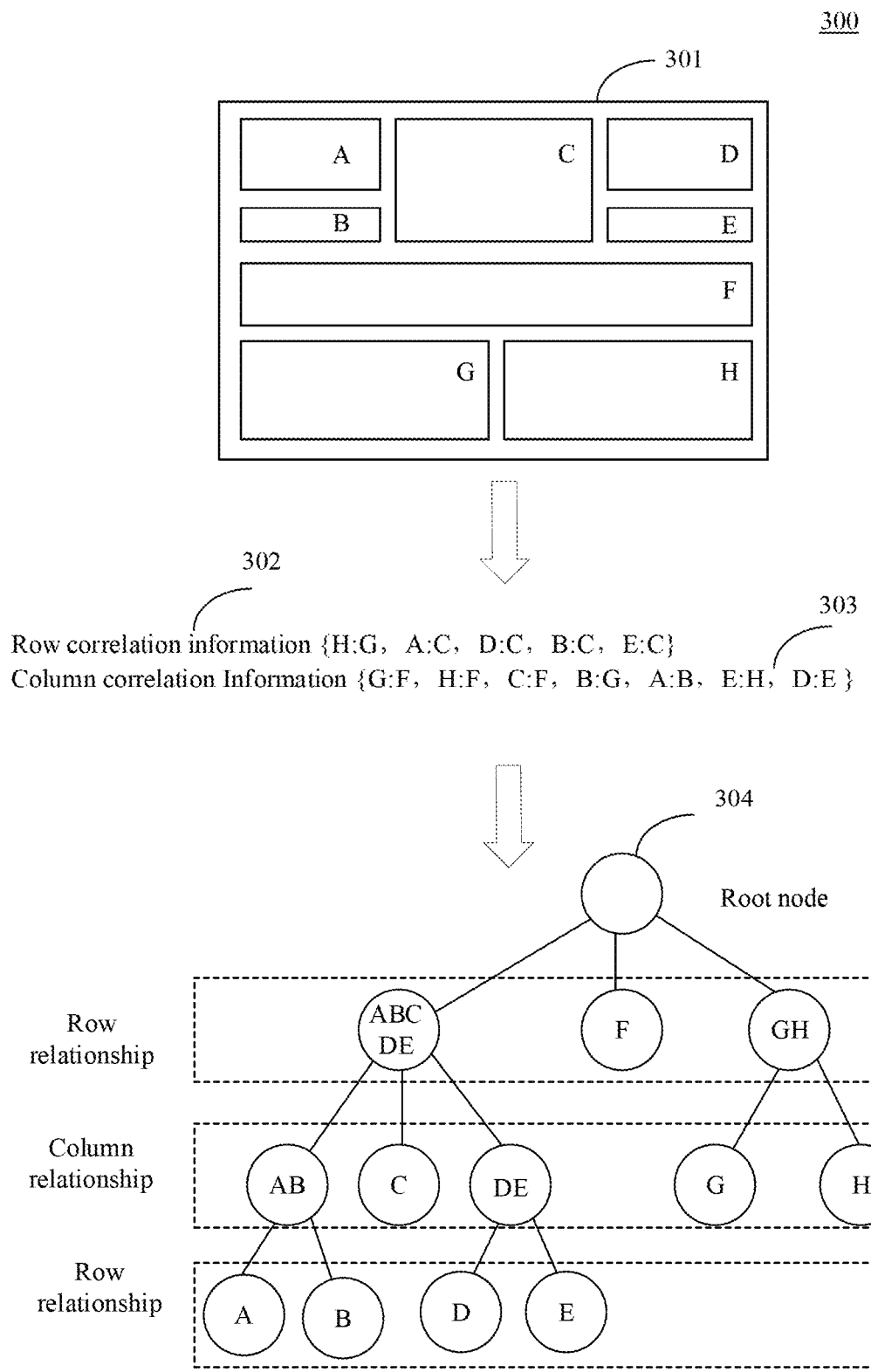
FIG. 3 is a flowchart of another embodiment of the method for generating a front-end code according to the present disclosure.

Specifically, as shown in FIG. 3, the executing body acquires child view elements A, B, C, D, E, F, G and H corresponding to the same parent view element 301 in the target UI view interface. Here, the row correlation information 302 between the child view elements is {H:G, A:C, D:C, B:C, E:C}. Here, H:G represents that the child view element H is in the row where the child view element G is, and A:C, D:C, B:C and E:C represent that the child view elements A, B, D and E are in the row where the child view element C is. The column correlation information 303 between the child view elements is {G:F, H:F, C:F, B:G, A:B, E:H, D:E}. Here, G:F, H:F and C:F represent that the child view elements G, H and C are in the column where the child view element F is, B:G represents that the child view element B is in the column where the child view element G is, A:B represents that the child view element A is in the column where the child view element B is, E:H represents that the child view element E is in the column where the child view element H is, and D:E represents that the child view element D is in the column where the child view element E is.

Further, the executing body determines the parent view element 301 as the root node at the first level of the DOM tree 304, and determines the nodes (i.e., a node ABCDE, a node F and a node GH) at the second level of the DOM tree 304 according to the row correlation information 302 {H:G, A:C, D:C, B:C, E:C} between the child view elements. Here, the node ABCDE is obtained by classifying the child view elements A, B, C, D and E that are in the same row, the node F is obtained by classifying the child view element F that is alone in one row, and the node GH is obtained by classifying the child view elements G and H that are in the same row. The executing body continues to determine the nodes at the third level of the DOM tree 304 according to the column correlation information 303 {G:F, H:F, C:F, B:G, A:B, E:H, D:E} between the child view elements. Here, a non-leaf node at the second level is a parent node of a node at the third level. The executing body determines the node AB, the node C, the node DE, the node G and the node H at the third level according to the column correlation information 303 between the child view elements and the parent node at an upper level. Here, the node AB, the node C and the node DE are child nodes of the node ABCDE. The node AB is obtained by classifying the child view elements A and B that are in the same column, and the node DE is obtained by classifying the child view elements D and E that are in the same column. The node G and the node H are child nodes of the node GH. The node G is obtained by classifying the child view element G that is alone in one column, and the node H is obtained by classifying the child view element H that is alone in one column.

Further, the executing body determines the node A, the node B, the node C and the node D at the fourth level of the DOM tree 304 according to the non-leaf node at the third level and the row correlation information 302 between the child view elements. Up to this point, the leaf nodes of the DOM tree 304 are individual child view elements.

It should be noted that the row correlation information may be directly obtained according to a comparison performed on the ordinates in the absolute positioning information of the child view elements and the heights of the child view elements; or may be obtained by performing a comparison on the ordinates in the absolute positioning information of the child view elements and the heights according to a descending order of the heights of the child view elements, which is not limited in the present disclosure.

The column correlation information may be directly obtained according to a comparison performed on the abscissas in the absolute positioning information of the child view elements and the widths of the child view elements; or may be obtained by performing a comparison on the abscissas in the absolute positioning information of the child view elements and the widths according to a descending order of the widths of the child view elements, which is not limited in the present disclosure.

In some alternative implementations, the row correlation information is obtained by: comparing, according to the descending order of the heights of the child view elements, the ordinates in absolute positioning information of the child view elements and the heights of the child view elements, to obtain the row correlation information between the child view elements.

In this implementation, the attribute information includes an ordinate in the absolute positioning information of the view element and the height of the view element. According to a descending order of heights of the view elements, the executing body may respectively compare the ordinates in the absolute positioning information of every two child view elements and the heights of the every two child view elements, to obtain the row correlation information between the child view elements.

Specifically, the executing body may construct a one-dimensional column matrix H*1 having the same height as the target UI view interface, sort the child view elements according to the descending order of the heights, fill, according to the sorting result, the one-dimensional matrix with the child view elements sequentially according to the ordinates in the absolute positioning information and the heights, and record the relative position information of the child view elements in the matrix in height. For example, the attribute information of the child view element M is {id:M y:5 h:30}, and the attribute information of the child view element N is {id:N y:10 h:20}. The child view elements M and N are sorted according to the heights to obtain the child view element M> the child view element N. The ordinates in the absolute positioning information of the child view elements and the heights of the child view elements are sequentially compared according to the above sorting, thus obtaining N: {M:20}. That is, the child view element N occupies 20 pixels of the child view element M in height, that is, the child view element M and the child view element N are in the same row.

In this implementation, the ordinates in the absolute positioning information of the child view elements and the heights of the child view elements are compared according to the descending order of the heights of the child view elements to obtain the row correlation information between the child view elements, which avoids the traversal loop of comparison for the relative position relationship of the child view elements in height, reduces the number of recursive loops of the code and reduces the time complexity of an algorithm.

In some alternative implementations, the column correlation information is obtained by: comparing, according to the descending order of the widths of the child view elements, the abscissas in absolute positioning information of the child view elements and the widths of the child view elements, to obtain the column correlation information between the child view elements.

In this implementation, the attribute information includes an abscissa in the absolute positioning information of the view element and the width of the view element. According to a descending order of widths of the view elements, the executing body may respectively compare the abscissas in the absolute positioning information of every two child view elements and the widths of the every two child view elements, to obtain the column correlation information between the child view elements.

Specifically, the executing body may construct a one-dimensional row matrix 1*W having the same width as the target UI view interface, sort the child view elements according to the descending order of the widths, fill, according to the sorting result, the one-dimensional row matrix with the child view elements sequentially according to the abscissas in the absolute positioning information and the widths, and record the relative position information of the child view elements in the matrix in width. For example, the attribute information of the child view element P is {id:P x:5 w:20}, and the attribute information of the child view element Q is {id:Q x:5 w:10}. The child view elements P and Q are sorted according to the width to obtain the child view element P> the child view element Q. The abscissas in the absolute positioning information of the child view elements and the widths of the child view elements are sequentially compared according to the above sorting, thus obtaining Q: {P:10}. That is, the child view element P occupies 10 pixel points of the child view element Q in width, that is, the child view element P and the child view element Q are in the same column.

In this implementation, the abscissas in the absolute positioning information of the view elements and the widths of the view elements are compared according to the descending order of the widths of the view elements to obtain the column correlation information between the child view elements, which avoids the traversal loop of comparison for the relative position relationship of the child view elements in width, reduces the number of recursive loops of the code and reduces the time complexity of an algorithm.

Step 204, generating a complete front-end code corresponding to the target UI view interface based on the DOM tree.

In this embodiment, after acquiring the DOM tree, the executing body may directly perform a style derivation based on the DOM tree, to generate the complete front-end code corresponding to the target UI view interface; or may further determine a child view element having a partial superimposition relationship with a leaf node of the DOM tree based on the DOM tree, and perform a style derivation according to the DOM tree and the child view element having the partial superimposition relationship with the leaf node of the DOM tree to generate the complete front-end code corresponding to the target UI view interface, which is not limited in the present disclosure.

Here, the executing body may perform the style derivation using a view layout method in the existing technology or the technology developed in the future, for example, a Flex layout, an outer margin layout, etc. in a CSS (cascading style sheet), which is not limited in the present disclosure.

Here, Flex is the FlexiableBox, which is mainly used for a flexible layout.

In some alternative implementations, the generating a complete front-end code corresponding to the target UI view interface based on the DOM tree includes: performing the style derivation on the DOM tree using the Flex layout, to obtain a derived DOM tree; and generating the complete front-end code corresponding to the target UI view interface based on the derived DOM tree.

In this implementation, the executing body may perform the style derivation on the DOM tree by using the Flex layout. The alignment of main axes may be divided into three types: start, center, and end. After the derived DOM tree is obtained, the complete front-end code corresponding to the target UI view interface is further generated based on the derived DOM tree.

Specifically, the Flex layout is used. Taking a row structure as an example, the centerlines m=(2y+h)/2 (y is used to indicate the upper margin of a view element, and h is used to indicate the height of the view element) of the rows where a parent view element and a child view element are in are calculated. If the m value of the child view element is less than the m value of the parent view element, the start alignment is used. If the m value of the child view element is greater than the m value of the parent view element, the end alignment is used. If the m value of the child view element is equal to the m value of the parent view element, the center alignment is used.

In this implementation, the style derivation is performed on the DOM tree having row and column structures by using the Flex layout. That is, a row layout div (flex-directive: row) and a column layout div (flex-directive: column) are used to implement a style control, which can not only simply and completely realize a complex page style but also responsively adapt to screens of different sizes as compared with an outer margin style.

In some alternative implementations, the generating a complete front-end code corresponding to the target UI view interface based on the DOM tree includes: performing the style derivation based on the DOM tree and the child view element having the partial superimposition relationship with the leaf node of the DOM tree, to generate the complete front-end code corresponding to the target UI view interface.

In this implementation, after acquiring the DOM tree having row and column structures, the executing body may further determine the relative positioning information of the child view element having the partial superimposition relationship with the leaf node of the DOM tree, and perform the style derivation according to the DOM tree and the relative positioning information of the child view element having the partial superimposition relationship with the leaf node of the DOM tree, to generate the complete front-end code corresponding to the target UI view interface.

In this implementation, the style derivation is performed based on the DOM tree and the child view element having the partial superimposition relationship with the leaf node of the DOM tree, to generate the complete front-end code corresponding to the target UI view interface. Accordingly, the child view element having a partial superimposition relationship with a child view element is fully considered, thereby ensuring the integrity of the generated front-end code.

Figure 4:
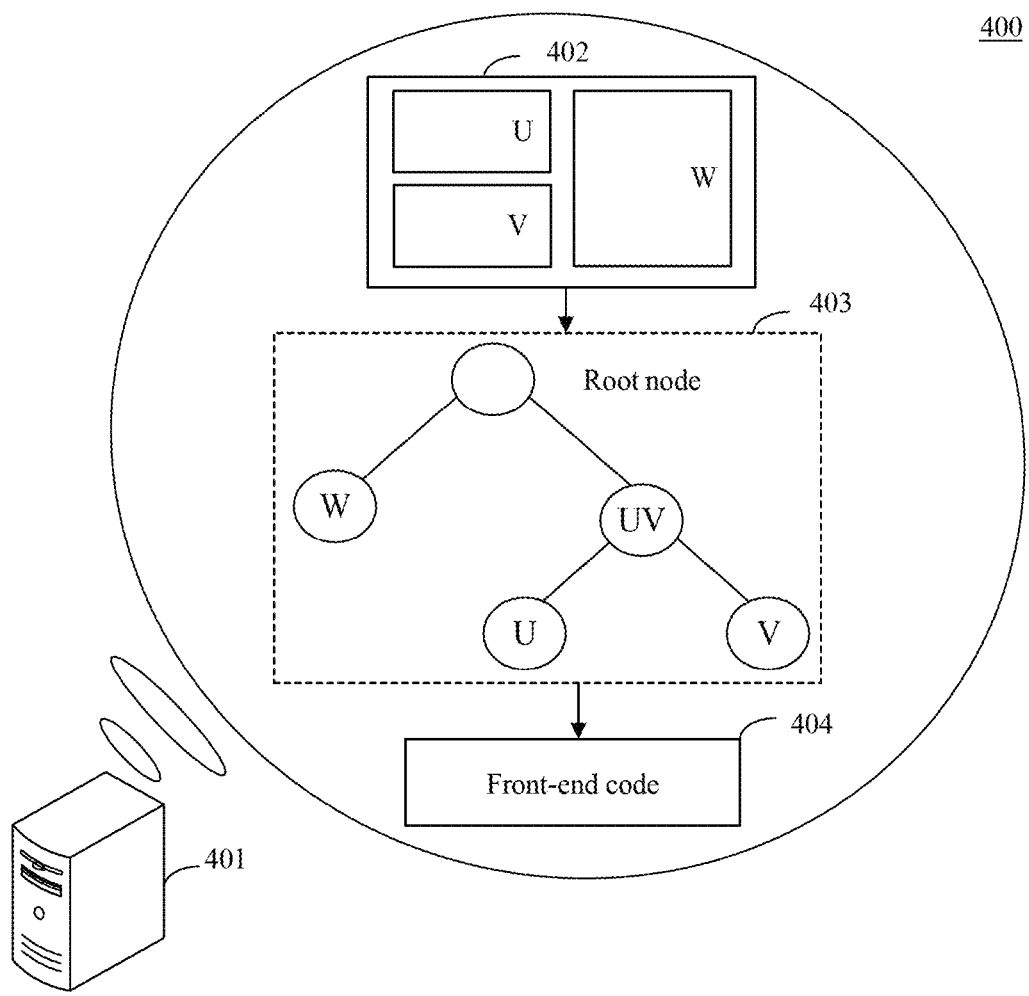
FIG. 4 is a schematic diagram of an application scenario of the method for generating a front-end code according to the present disclosure.

Further referring to FIG. 4, FIG. 4 is a schematic diagram of an application scenario of the method for generating a front-end code according to this embodiment.

In the application scenario of FIG. 4, an executing body 401 acquires attribute information of view elements in a target UI view interface; and determines child view elements U, V and W corresponding to the same parent view element 402 based on the attribute information of the view elements. Further, according to column correlation information between the child view elements, the executing body classifies the child view elements U and V in the same column as a node UV at the second level of a DOM tree corresponding to the parent view element except a root node (at the first level), and classifies the child view element W alone in one column as a node W at the second level. According to row correlation information between the child view elements, the executing body continues to classify the child view elements V and U in different rows as a node U and a node V at the third level. Here, the node UV is the parent node of the node U and the node V. At this time, the leaf node is an individual child view element, thus obtaining a DOM tree 403. The executing body generates a complete front-end code 404 corresponding to the target UI view interface based on the DOM tree 403.

According to the method for generating a front-end code in the present disclosure, the attribute information of the view elements in the target UI view interface is acquired; the child view elements corresponding to the same parent view element are determined based on the attribute information of the view elements; the nodes at different levels of the DOM tree corresponding to the parent view element except the root node are determined according alternately to the row correlation information and the column correlation information between the child view elements, until the leaf node is an individual child view element, thus obtaining the DOM tree; and the complete front-end code corresponding to the target UI view interface is generated based on the DOM tree. Accordingly, the generated front-end code is more in line with development habits and has higher readability.

Figure 5:
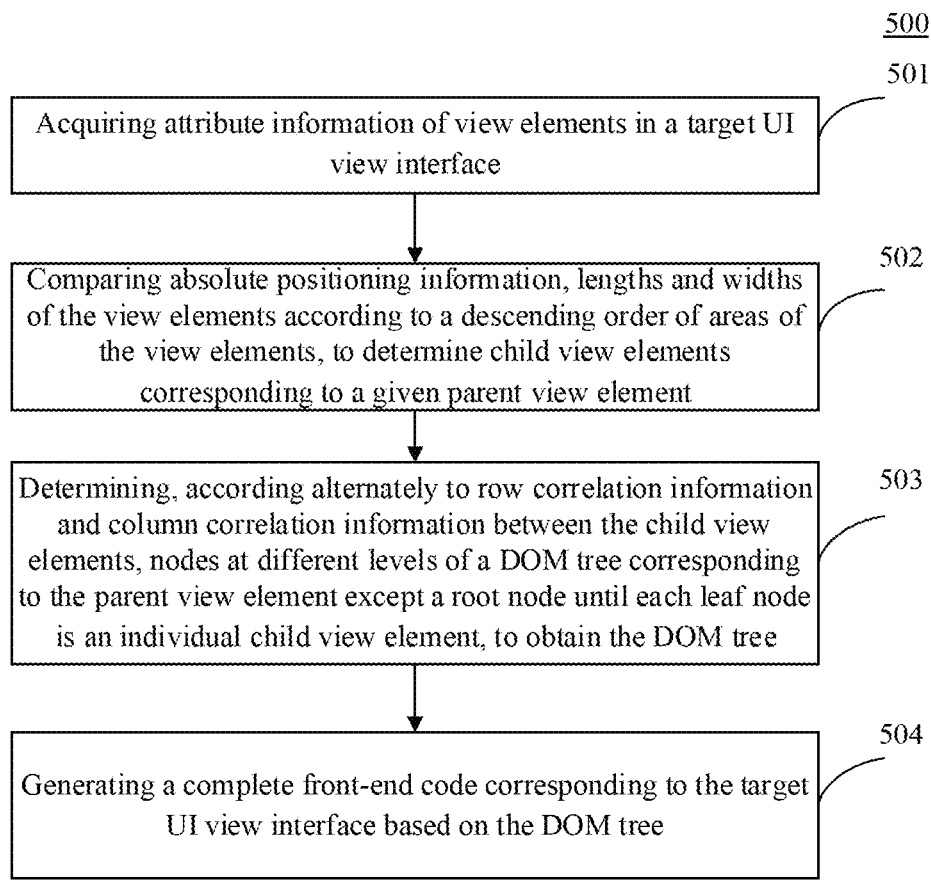
FIG. 5 is a flowchart of another embodiment of the method for generating a front-end code according to the present disclosure.

Further referring to FIG. 5, FIG. 5 illustrates a flow 500 of another embodiment of the method for generating a front-end code shown in FIG. 2. In this embodiment, the attribute information includes absolute positioning information, a height and a width of a view element. The flow 500 of the method for generating a front-end code in this embodiment may include the following steps.

Step 501, acquiring attribute information of view elements in a target UI view interface.

In this embodiment, for the implementation details and technical effect of step 501, reference may be made to the description for step 201, and thus, the details will not be repeatedly described here.

Step 502, comparing absolute positioning information, heights and widths of the view elements according to a descending order of areas of the view elements, to determine child view elements corresponding to a given parent view element.

In this embodiment, the executing body may compare the absolute positioning information, heights and widths of every two view elements according to the descending order of the areas of the view elements, to determine the child view elements corresponding to the given parent view element.

Specifically, the executing body may construct a matrix having the same size as the target UI view interface. For example, if the target UI view interface is 1280*980, a matrix of 1280*980 is constructed. The executing body may perform sorting according to the descending order of the areas (width*height) of the view elements, fill, according to the sorting result, the matrix with the child view elements sequentially according to the absolute positioning information, the widths and the heights, and record the relative position information of the child view elements in the matrix. For example, the attribute information of a view element A is {id:A x:0 y:0 w:100 h:20}, the attribute information of a view element B is {id:B x:10 y:5 w:80 h:10}, and the attribute information of a view element C is {id:C x:10 y:17 w:5 h:3}. The view elements A, B and C are sorted according to the areas to obtain the view element A> the view element B> the view element C. Every two view elements are respectively compared according to the areas of the view elements to obtain B: {A:800} (i.e., the view element B is a child view of the view element A and occupies 800 pixels of the view element A) and C: {A:15} (i.e., the view element C is a child view of the view element A and occupies 15 pixels of the view element A). Further, it can be determined that the view elements B and C are child views of the view element A, and there is no partial superimposition relationship between the view elements B and C Step 503, determining, according alternately to row correlation information and column correlation information between the child view elements, nodes at different levels of a DOM tree corresponding to the parent view element except a root node until each leaf node is an individual child view element, to obtain the DOM tree.

In this embodiment, for the implementation details and technical effect of step 503, reference may be made to the description for step 203, and thus, the details will not be repeatedly described here.

Step 504, generating a complete front-end code corresponding to the target UI view interface based on the DOM tree.

In this embodiment, for the implementation details and technical effect of step 504, reference may be made to the description for step 204, and thus, the details will not be repeatedly described here.

It can be seen from FIG. 5 that, as compared with the embodiment corresponding to FIG. 2, the flow 500 of the method for generating a front-end code in this embodiment reflects that the absolute positioning information, heights and widths of the view elements are compared according to the descending order of the areas of the view elements to determine the child view elements corresponding to the same parent view element, and that the DOM tree is generated based on the child view elements corresponding to the same parent view element to further generate the front-end code, which avoids the traversal loop of comparison for the relative position relationship of the child view elements, reduces the number of recursive loops of the code and reduces the time complexity of an algorithm, thereby improving the efficiency of generating the front-end code.

Figure 6:
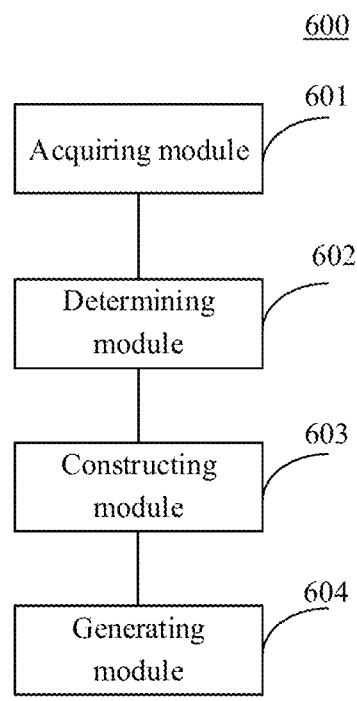
FIG. 6 is a schematic diagram of an embodiment of an apparatus for generating a front-end code according to the present disclosure.

Further referring to FIG. 6, as an implementation of the method shown in the above drawings, the present disclosure provides an embodiment of an apparatus for generating a front-end code. The embodiment of the apparatus corresponds to the embodiment of the method shown in FIG. 1. The apparatus may be applied in various electronic devices.

As shown in FIG. 6, the apparatus 600 for generating a front-end code in this embodiment includes: an acquiring module 601, a determining module 602, a constructing module 603 and a generating module 604.

Here, the acquiring module 601 may be configured to acquire attribute information of view elements in a target UI view interface.

The determining module 602 may be configured to determine child view elements corresponding to a given parent view element based on the attribute information of the view elements.

The constructing module 603 may be configured to determine, according alternately to row correlation information and column correlation information between the child view elements, nodes at different levels of a DOM tree corresponding to the parent view element except a root node until each leaf node is an individual child view element, to obtain the DOM tree.

The generating module 604 may be configured to generate a complete front-end code corresponding to the target UI view interface based on the DOM tree.

In some alternative implementations of this embodiment, the determining module is further configured to: compare absolute positioning information, heights and widths of the view elements according to a descending order of areas of the view elements, to determine the child view elements corresponding to the given parent view element.

In some alternative implementations of this embodiment, the row correlation information is obtained by: comparing, according to a descending order of heights of the child view elements, ordinates in absolute positioning information of the child view elements and the heights of the child view elements, to obtain the row correlation information between the child view elements.

In some alternative implementations of this embodiment, the column correlation information is obtained by: comparing, according to a descending order of widths of the child view elements, abscissas in the absolute positioning information of the child view elements and the widths of the child view elements, to obtain the column correlation information between the child view elements.

In some alternative implementations of this embodiment, the generating module is further configured to: perform a style derivation on the DOM tree using a Flex layout, to obtain a derived DOM tree; and generate the complete front-end code corresponding to the target UI view interface based on the derived DOM tree.

In some alternative implementations of this embodiment, the style derivation is performed based on the DOM tree and a child view element having a partial superimposition relationship with a leaf node of the DOM tree, to generate the complete front-end code corresponding to the target UI view interface.

According to an embodiment of the present disclosure, the present disclosure further provides an electronic device and a readable storage medium.

Figure 7:
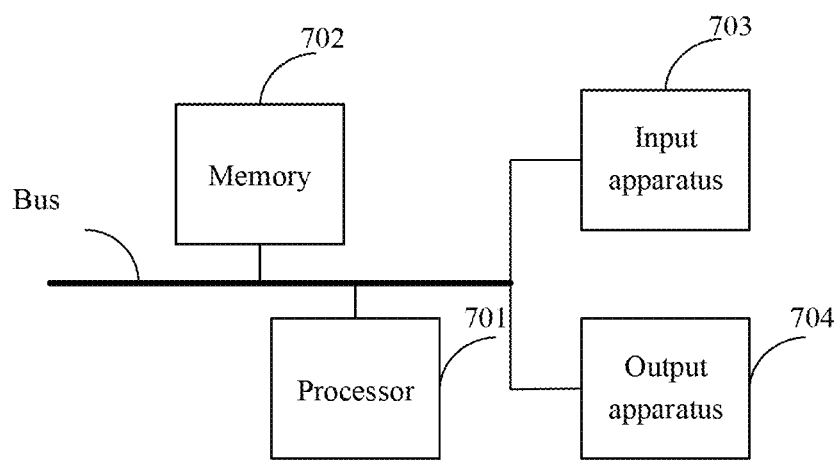
FIG. 7 is a schematic structural diagram of a computer system of a server adapted to implement the embodiments of the present disclosure.

As shown in FIG. 7, FIG. 7 is a block diagram of an electronic device of the method for generating a front-end code according to embodiments of the present disclosure.

700 is the block diagram of the electronic device of the method for generating a front-end code according to the embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital assistant, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 7, the electronic device includes: one or more processors 701, a memory 702, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 7, one processor 701 is used as an example.

The memory 702 is a non-transitory computer readable storage medium provided by the present disclosure. The memory stores instructions executable by at least one processor, so that the at least one processor performs the method for generating a front-end code provided by the present disclosure. The non-transitory computer readable storage medium of the present disclosure stores computer instructions for causing a computer to perform the method for generating a front-end code provided by the present disclosure.

The memory 702, as a non-transitory computer readable storage medium, may be used to store non-transitory software programs, non-transitory computer executable programs and modules, such as program instructions/modules corresponding to the method for generating a front-end code in the embodiments of the present disclosure (for example, the acquiring module 601, the determining module 602, the constructing module 603, and the generating module 604 shown in FIG. 6). The processor 701 executes the non-transitory software programs, instructions, and modules stored in the memory 702 to execute various functional applications and data processing of the server, that is, to implement the method for generating a front-end code in the foregoing method embodiment.

The memory 702 may include a storage program area and a storage data area, where the storage program area may store an operating system and at least one function required application program; and the storage data area may store data created by the use of the electronic device according to the method for generating a front-end code, etc. In addition, the memory 702 may include a high-speed random access memory, and may also include a non-transitory memory, such as at least one magnetic disk storage device, a flash memory device, or other non-transitory solid-state storage devices. In some embodiments, the memory 702 may optionally include memories remotely provided with respect to the processor 701, and these remote memories may be connected to the electronic device of the method for generating a front-end code through a network. Examples of the above network include but are not limited to the Internet, intranet, local area network, mobile communication network, and combinations thereof.

The electronic device of the method for generating a front-end code may further include: an input apparatus 703 and an output apparatus 704. The processor 701, the memory 702, the input apparatus 703, and the output apparatus 704 may be connected through a bus or in other methods. In FIG. 7, connection through a bus is used as an example.

The input apparatus 703 may receive input digital or character information, and generate key signal inputs related to user settings and function control of the electronic device of the method for generating a front-end code, such as touch screen, keypad, mouse, trackpad, touchpad, pointing stick, one or more mouse buttons, trackball, joystick and other input apparatuses. The output apparatus 704 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution of the embodiments of the present disclosure, the generated front-end code is more in line with development habits and has higher readability.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A computer-implemented method for transforming visual layout data into a hierarchical document structure, the method comprising:
   acquiring, by a processor, a dataset comprising attribute information of view elements in a target UI view interface, the attribute information of the view elements comprising absolute position coordinates and a dimension;
   processing, by the processor, the dataset to identify child view elements corresponding to a given parent view element based on the attribute information of the view elements, and filtering the dataset to identify a subset of the child view elements that do not have a partial superimposition relationship between themselves;
   constructing, by the processor, a DOM, Document Object Model, tree data structure from the subset of child view elements by:
      determining, according alternately to row correlation information and column correlation information between the child view elements, nodes at different levels of a DOM, Document Object Model, tree corresponding to the parent view element except a root node until each leaf node is an individual child view element, comprising:
      performing a first grouping operation by grouping child view elements into a first plurality of nodes based on determined row correlations between the child view elements, and
      performing a second grouping operation comprising for a node in the first plurality, grouping its constituent child view elements into a second plurality of child nodes based on determined column correlations between the child view elements;
      performing the first grouping operation and the second grouping operation for each non-leaf node until each leaf node is an individual child view element; and
   outputting the DOM tree data structure; and
   generating, by the processor, a complete front-end code corresponding to the target UI view interface based on the DOM tree.

2. The computer-implemented method according to claim 1,
   wherein the attribute information comprises absolute positioning information, a height and a width of a view element,
   and determining the child view elements corresponding to the given parent view element based on the attribute information of the view elements comprises:
   comparing absolute positioning information, heights and widths of the view elements according to a descending order of areas of the view elements, to determine the child view elements corresponding to the given parent view element.

3. The computer-implemented method according to claim 1,
   wherein the attribute information comprises an ordinate in absolute positioning information of a view element and a height of the view element,
   and the row correlation information is obtained by:
   comparing, according to a descending order of heights of the child view elements, ordinates in absolute positioning information of the child view elements and the heights of the child view elements, to obtain the row correlation information between the child view elements.

4. The computer-implemented method according to claim 1,
   wherein the attribute information comprises an abscissa in absolute positioning information of a view element and a width of the view element,
   and the column correlation information is obtained by:
   comparing, according to a descending order of widths of the child view elements, abscissas in the absolute positioning information of the child view elements and the widths of the child view elements, to obtain the column correlation information between the child view elements.

5. The computer-implemented method according to claim 1,
   wherein generating the complete front-end code corresponding to the target UI view interface based on the DOM tree comprises:
   performing a style derivation on the DOM tree using a Flex layout, thereby obtaining a derived DOM tree; and
   generating the complete front-end code corresponding to the target UI view interface based on the derived DOM tree.

6. The computer-implemented method according to claim 1,
   wherein generating the complete front-end code corresponding to the target UI view interface based on the DOM tree comprises:
   performing a style derivation based on the DOM tree and a child view element having a partial superimposition relationship with a leaf node of the DOM tree, to generate the complete front-end code corresponding to the target UI view interface.

7. The computer-implemented method according to claim 1, the method further comprising:
   before the first grouping operation:
   sorting into a descending sort order the subset of child view elements based on one of more properties of the child view elements in the attribute information comprising area, height or width, to obtain a sorted order of child view elements; and
   comparing vertical positioning attributes of the child view elements according to the descending sort order to obtain determined row correlation information, and
   comparing horizontal positioning attributes of the child view elements according to the descending sort order to obtain column correlation information.

8. The non-transitory computer readable storage medium according to claim 7, the method further comprising:
   obtaining the determined row correlation by performing the following operations:
   constructing a one-dimensional matrix having the same height as the target UI view interface,
   sorting the child view elements according to the descending order of heights,
   filling, according to the sorting result, the one-dimensional matrix with the child view elements sequentially according to ordinates in absolute positioning information and the heights,
   recording the relative position information of the child view elements in the matrix in height;
   and/or obtaining the determined column correlation by performing the following operations:
   constructing a one-dimensional matrix having the same width as the target UI view interface, sorting the child view elements according to the descending order of widths, filling, according to the sorting result, the one-dimensional matrix with the child view elements sequentially according to abscissas in absolute positioning information and the widths, recording the relative position information of the child view elements in the matrix in width.

9. An apparatus for transforming visual layout data into a hierarchical document structure, comprising:

at least one processor; and a memory, in communication with the at least one processor, wherein the memory stores instructions executable by the at least one processor, to enable the at least one processor to perform operations, the operations comprising:

acquiring, by the processor, a dataset comprising attribute information of view elements in a target UI view interface, the attribute information of the view elements comprising absolute position coordinates and a dimension;

processing, by the processor, the dataset to identify child view elements corresponding to a given parent view element based on the attribute information of the view elements, and filtering the dataset to identify a subset of the child view elements that do not have a partial superimposition relationship between themselves;

constructing, by the processor, a DOM, Document Object Model, tree data structure from the subset of child view elements by:

determining, according alternately to row correlation information and column correlation information between the child view elements, nodes at different levels of a DOM, Document Object Model, tree corresponding to the parent view element except a root node until each leaf node is an individual child view element, comprising:

sorting the subset of child view elements into a descending order based on one of more of their geometric properties comprising area, height or width obtained from the attribute information, comparing vertical positioning attributes and heights of the child view elements according to the descending sort order to obtain determined row correlation information, and comparing horizontal positioning attributes and widths of the child view elements according to the descending sort order to obtain column correlation information; and then performing a first grouping operation by grouping child view elements into a first plurality of nodes based on the determined row correlations between the child view elements, and performing a second grouping operation comprising for a node in the first plurality, grouping its constituent child view elements into a second plurality of child nodes based on the determined column correlations between the child view elements;

performing the first grouping operation and the second grouping operation for each non-leaf node until each leaf node is an individual child view element; and outputting the DOM tree data structure to the memory; and generating, by the processor, a complete front-end code corresponding to the target UI view interface based on the DOM tree.

10. The apparatus according to claim 9, wherein the attribute information comprises absolute positioning information, a height and a width of a view element, and determining the child view elements corresponding to the given parent view element based on the attribute information of the view elements comprises:

comparing absolute positioning information, heights and widths of the view elements according to a descending order of areas of the view elements, to determine the child view elements corresponding to the given parent view element.

11. The apparatus according to claim 9, wherein the attribute information comprises an ordinate in absolute positioning information of a view element and a height of the view element, and the row correlation information is obtained by:

comparing, according to a descending order of heights of the child view elements, ordinates in absolute positioning information of the child view elements and the heights of the child view elements, to obtain the row correlation information between the child view elements.

12. The apparatus according to claim 9, wherein the attribute information comprises an abscissa in absolute positioning information of a view element and a width of the view element, and the column correlation information is obtained by:

comparing, according to a descending order of widths of the child view elements, abscissas in the absolute positioning information of the child view elements and the widths of the child view elements, to obtain the column correlation information between the child view elements.

13. The apparatus according to claim 9, wherein generating the complete front-end code corresponding to the target UI view interface based on the DOM tree comprises:

performing a style derivation on the DOM tree using a Flex layout, to obtain a derived DOM tree; and generating the complete front-end code corresponding to the target UI view interface based on the derived DOM tree.

14. The apparatus according to claim 9, wherein generating the complete front-end code corresponding to the target UI view interface based on the DOM tree comprises:

performing a style derivation based on the DOM tree and a child view element having a partial superimposition relationship with a leaf node of the DOM tree, to generate the complete front-end code corresponding to the target UI view interface.

15. A non-transitory computer readable storage medium, storing a computer instruction, wherein the computer instruction when executed by a processor, causes the processor to perform operations for constructing a hierarchical document structure from visual layout data, the operations comprising:

acquiring, by the processor, a dataset comprising attribute information of view elements in a target UI view interface, the attribute information of the view elements comprising absolute position coordinates and a dimension;

processing, by the processor, the dataset to identify child view elements corresponding to a given parent view element based on the attribute information of the view elements and filtering the dataset to identify a subset of the child view elements that do not have a partial superimposition relationship between themselves;

constructing, by the processor, a DOM, Document Object Model, tree data structure from the subset of child view elements by:
  determining, according alternately to row correlation information and column correlation information between the child view elements, nodes at different levels of a DOM, Document Object Model, tree corresponding to the parent view element except a root node until each leaf node is an individual child view element comprising:
  performing a first grouping operation by grouping child view elements into a first plurality of nodes based on determined row correlations between the child view elements, such that child view elements which are determined to be on a same row are grouped into a same node, and
  performing a second grouping operation comprising for a node in the first plurality, grouping its constituent child view elements into a second plurality of child nodes based on determined column correlations between the child view elements, such that child view elements which are determined to be in a same column are grouped into a same node;
  performing the first grouping operation and the second grouping operation for each non-leaf node until each leaf node is an individual child view element; and
  outputting the DOM tree data structure; and
generating, by the processor, a complete front-end code corresponding to the target UI view interface based on the DOM tree.

16. The non-transitory computer readable storage medium according to claim 15, wherein the attribute information comprises absolute positioning information, a height and a width of a view element, and determining the child view elements corresponding to the given parent view element based on the attribute information of the view elements comprises:
  comparing absolute positioning information, heights and widths of the view elements according to a descending order of areas of the view elements, to determine the child view elements corresponding to the given parent view element.

17. The non-transitory computer readable storage medium according to claim 15, wherein the attribute information comprises an ordinate in absolute positioning information of a view element and a height of the view element, and the row correlation information is obtained by:
  comparing, according to a descending order of heights of the child view elements, ordinates in absolute positioning information of the child view elements and the heights of the child view elements, to obtain the row correlation information between the child view elements.

18. The non-transitory computer readable storage medium according to claim 15, wherein the attribute information comprises an abscissa in absolute positioning information of a view element and a width of the view element, and the column correlation information is obtained by:
  comparing, according to a descending order of widths of the child view elements, abscissas in the absolute positioning information of the child view elements and the widths of the child view elements, to obtain the column correlation information between the child view elements.

19. The non-transitory computer readable storage medium according to claim 15, wherein generating the complete front-end code corresponding to the target UI view interface based on the DOM tree comprises:
  performing a style derivation on the DOM tree using a Flex layout, to obtained a derived DOM tree; and
  generating the complete front-end code corresponding to the target UI view interface based on the derived DOM tree.

20. The non-transitory computer readable storage medium according to claim 15, wherein generating the complete front-end code corresponding to the target UI view interface based on the DOM tree comprises:
  performing a style derivation based on the DOM tree and a child view element having a partial superimposition relationship with a leaf node of the DOM tree, to generate the complete front-end code corresponding to the target UI view interface.

* * * * *